United States Patent [19]

Myerson et al.

[11] Patent Number: 4,559,313

[45] Date of Patent: Dec. 17, 1985

[54] REMOVAL OF INORGANIC CONTAMINANTS FROM CATALYSTS

[75] Inventors: Allan S. Myerson, Marietta; William R. Ernst, Roswell, both of Ga.

[73] Assignee: Georgia Tech Research Institute, Atlanta, Ga.

[21] Appl. No.: 517,027

[22] Filed: Jul. 25, 1983

Related U.S. Application Data

[63] Continuation-in-part of Ser. No. 313,458, Oct. 21, 1981, abandoned.

[51] Int. Cl.$^4$ .......................... B01J 23/94; B01J 21/20; C22B 3/00; C12D 13/00
[52] U.S. Cl. ................................ 502/25; 75/101 BE; 75/104; 208/113; 208/216 R; 435/262; 502/27; 502/31; 502/516
[58] Field of Search ...................... 502/25, 27, 31, 33, 502/50, 516; 423/68, 150; 75/104; 208/113, 216 R

[56] References Cited

U.S. PATENT DOCUMENTS

| | | | |
|---|---|---|---|
| 2,668,798 | 2/1954 | Plank | 502/516 |
| 2,829,964 | 4/1958 | Zimmerley et al. | 435/262 |
| 3,122,497 | 2/1964 | Erickson | 502/27 |
| 3,147,228 | 9/1964 | Erickson | 502/516 |
| 3,222,293 | 12/1965 | Erickson | 502/516 |
| 3,305,353 | 2/1967 | Duncan et al. | 435/262 |
| 3,414,524 | 12/1968 | Abson et al. | 252/411 |
| 3,562,150 | 2/1971 | Hamilton et al. | 502/516 |
| 3,679,397 | 7/1972 | O'Connor et al. | 435/262 |
| 4,102,811 | 7/1978 | Burk et al. | 502/516 |
| 4,163,709 | 8/1979 | Burk et al. | 208/120 |
| 4,163,710 | 8/1979 | Burk et al. | 208/120 |
| 4,272,400 | 6/1981 | Silbernagel et al. | 423/68 |
| 4,293,403 | 10/1981 | Burk, Jr. et al. | 423/150 |

FOREIGN PATENT DOCUMENTS

| | | | |
|---|---|---|---|
| 1044022 | 12/1978 | Canada | 75/104 |
| 0004431 | 10/1979 | European Pat. Off. | 435/262 |

Primary Examiner—P. E. Konopka
Attorney, Agent, or Firm—Newton, Hopkins & Ormsby

[57] ABSTRACT

Spent catalysts containing metal impurities are treated by a process comprising treating the spent catalyst with a solution containing oxidizing ferric ion and/or oxidizing bacteria, thereby freeing said spent catalyst of said metal impurities.

14 Claims, 2 Drawing Figures

REMOVAL OF INORGANIC CONTAMINANTS FROM CATALYSTS

CROSS-REFERENCE TO RELATED APPLICATIONS

This application is a continuation-in-part of application Ser. No. 313,458 filed Oct. 21, 1981 and now abandoned.

BACKGROUND OF THE INVENTION

Field of the Invention

The present invention relates to a method of regenerating solid catalysts by catalyst demetallization.

DESCRIPTION OF THE PRIOR ART

A variety of catalysts are known which are used extensively in various hydrocarbon treatment and conversion processes such as the hydrotreating of petrolum residues, cracking and the like. Other catalysts also have been used for the processing of coal liquids and other chemical materials. During catalytic processing inorganic compounds, metal sulfides and organometallic compounds are deposited on the surface and pores of the solid catalysts, thereby causing a loss of catalyst activity and selectivity. For instance, in the field of petroleum refining, it is well-known that various petroleum feedstocks contain at least trace quantities of many metals. For example, Middle Eastern crudes contain relatively high amounts of several metal components, while Venezuelan crudes are noteworthy for their vanadium content and are relatively low in other contaminating metals such as nickel. The need has been expressed in the art for better utilization of petroleum residues and similar hydrocarbon feeds. The chief deterrent to catalytic cracking of such feeds by conventional means has been the severe catalyst contamination, due to contaminant metal in many petroleum stocks which leads to poor catalyst activity and often to poor product distribution and otherwise reduces the desired effectiveness of the catalyst. Because most of these metals when present in a stock deposit in a relatively non-volatile form on the catalyst during the conversion processes, it is consequently difficult to regenerate the catalyst. The removal of coke does not remove these contaminants. Consequently, such feeds are generally avoided. Nickel and vanadium, for example, markedly alter the selectivity and activity of cracking reactions if allowed to accumulate, producing a higher yield of coke and hydrogen at the expense of desired products such as gasoline and butanes. The problem of nickel and vanadium accumulation in catalysts is particularly severe in the hydrotreating of petroleum residues which contain nickel and vanadium in the asphaltene fraction of the residue.

In the past a number of methods have been developed in the attempt to remove metal, as well as other types of contamination from spent catalysts, particularly those used in hydrocarbon processing. Many of these techniques employ at least one step in which the catalyst is washed with an aqueous acidic or basic solution. In one method as shown in U.S. Pat. No. 2,668,798, a spent, nickel poisoned siliceous cracking catalyst is washed with an aqueous mineral acid solution, and then after excess acid has been washed from the catalyst, the catalyst is subjected to steam treatment. In another technique described in U.S. Pat. No. 3,222,293, a spent hydrocarbon cracking catalyst is subjected to a sulfiding step in which the catalyst is subjected to a sulfur containing substance such as hydrogen sulfide followed by steps in which the catalyst is washed with dilute nitric acid and then an aqueous basic solution.

In another approach to catalyst regeneration shown by Burk et al in U.S. Pat. No. 4,163,710, a spent nickel and vanadium poisoned hydrocarbon conversion catalyst is treated by first subjecting the spent catalyst to a reductive wash with an aqueous solution of a reducing agent such as sulfur dioxide, oxalic acid, carbon monoxide or the like. The reductive wash is followed by an oxidative wash with an aqueous solution of the likes of an organic peroxide, hydrogen peroxide, ozone or a perchlorate. In a variation of this technique as shown in U.S. Pat. Nos. 4,102,811 and 4,163,709, the spent catalyst is subjected to an initial sulfidation step followed by oxidation prior to the reductive and oxidative washes. However, while the prior art treatment processes effect the removal of some of the material adversely affecting the catalysts, none of these processes are completely satisfactory, particularly with respect to the removal of metal contaminants from the pores of the catalyst structure.

Erickson, in U.S. Pat. No. 3,147,228, shows a process of removing metal contaminants from spent catalysts, particularly, catalysts contaminated with vanadium and nickel by treatment with hydrogen peroxide followed by an oxidative burn-off.

Abson et al in U.S. Pat. No. 3,414,524 show a method of activating a material such as bauxite which in its unactivated state does not possess catalytic activity. The reference process employs a bacterial agent either as an oxidizing agent or a reducing agent to achieve activation of the catalyst. For instance, in the case of bauxite which contains reduced iron salts, the crude bauxite can be treated with iron-oxidizing bacteria such as *Ferrobacillus ferrooxidans* to achieve the preparation of a new catalyst. On the other hand, the reference shows a method of preparing a catalyst using a sulfate reducing bacteria in which, for example, a nickel sulfate-nickel nitrate mixture is heated to provide a mixture of nickel oxide and nickel sulfate, and then the oxidized metal mixture is treated with the bacteria to reduce sulfate to sulfide. The nickel subsulfide catalyst is completed by contacting the metal mixture with a reducing gas such as coal gas. Accordingly, the reference shows methods by which various bacteria can be used to prepare catalysts from curde starting materials. The reference does not show a method of regenerating a spent catalyst material. A need, therefore, continues to exist for a method by which spent, metal contaminated catalysts can be regenerated.

SUMMARY OF THE INVENTION

Accordingly, one object of the present invention is to provide a method by which spent catalysts can be simply regenerated.

Another object of the present invention is to provide a method by which spent hydrocarbon conversion catalysts, particularly those contaminated with nickel and vanadium, can be regenerated while simultaneously allowing the recovery of metal values of commercial interest.

Still another object of the present invention is to provide a method by which metals can be recovered without regard to the reuse of the substrate from which the metals have been removed.

Briefly, these objects and other objects of the present invention as hereinafter will become more readily apparent can be attained by a method of treating spent catalysts containing metal impurities by a process comprising treating the spent catalyst with a solution containing oxidizing ferric ion and/or oxidizing bacteria, thereby freeing said spent catalyst of said metal impurities. By these techniques spent catalysts can be regenerated by freeing the same of metal impurities. The catalyst is then ready for reuse. Alternatively, if reuse of the spent catalyst is not contemplated, but the recovery of valuable metal impurities is desired, then the metal ion containing solution is treated by conventional methodology to isolate the extracted valuable metal.

DETAILED DESCRIPTION OF THE PREFERRED EMBODIMENTS

The present invention is based upon the discovery that spent catalysts can be freed of inorganic contaminants by treating the same with oxidizing bacteria and/or ferric ion. The spent catalysts which can be treated by the technique of the present invention include any catalyst contaminated with one or more metal contaminants. Spent catalysts which can be treated by the present process preferably include those which are obtained from the treatment of coal liquids and hydrocarbon refining processes such as cracking, hydrotreating, hydrocracking and the like and in particular catalysts which are contaminated by vanadium and/or nickel. Two particular types of catalyst which are very amenable to the present treatment method are the porous cobalt-molybdenum catalysts which are used in the hydrotreating of petroleum residues and the silica-alumina zeolite cracking catalysts which are used in the cracking of hydrocarbon feedstocks. The metal impurities in the spent catalysts are generally present as metal sulfides and organometallic compounds, particularly in those catalysts obtained from hydrocarbon treatment processes. However, in order to ensure that all metal impurities are present in the form of metal sulfides, the catalyst should be sulfided in order to convert the organometallic compounds to metal sulfides.

The catalyst treatment aspects of the present invention can, of course, be used to liberate metal ion contaminants from a catalyst so that the regenerated catalyst can be returned for reuse in the process in which it had previously been used. However, in the event a given treatment results in the removal of metals from the catalyst which are of value such as molybdenum, cobalt, tin, nickel and vanadium, the aqueous treatment solution can be recovered and treated by well-known chemical procedures to isolate the desired metal or metals of commmercial value. If the catalyst, per se, is of sufficient value, it may be returned for reuse in the process it had been previously used. On the other hand, if the treated catalyst is not of sufficient value, it may be simply discarded.

It is possible during the treatment of the spent catalyst by either major aspect of the present process that processing may result in the removal of metals which are a part of the catalyst, thus rendering the treated catalyst obtained inactive. In this case, since catalyst effectiveness is destroyed, the catalyst is discarded.

In the first aspect of the treatment process of the present invention, catalyst regeneration is effected basically by an initial sulfidation step followed by treatment of the sulfided catalyst with oxidizing ferric ion. This treatment process can be utilized to treat a fixed bed catalyst within a reactor without removing the catalyst from the reactor. Alternatively, the catalyst may be removed from the reactor and processed in a multi-stage metals removal unit.

Figure 1:
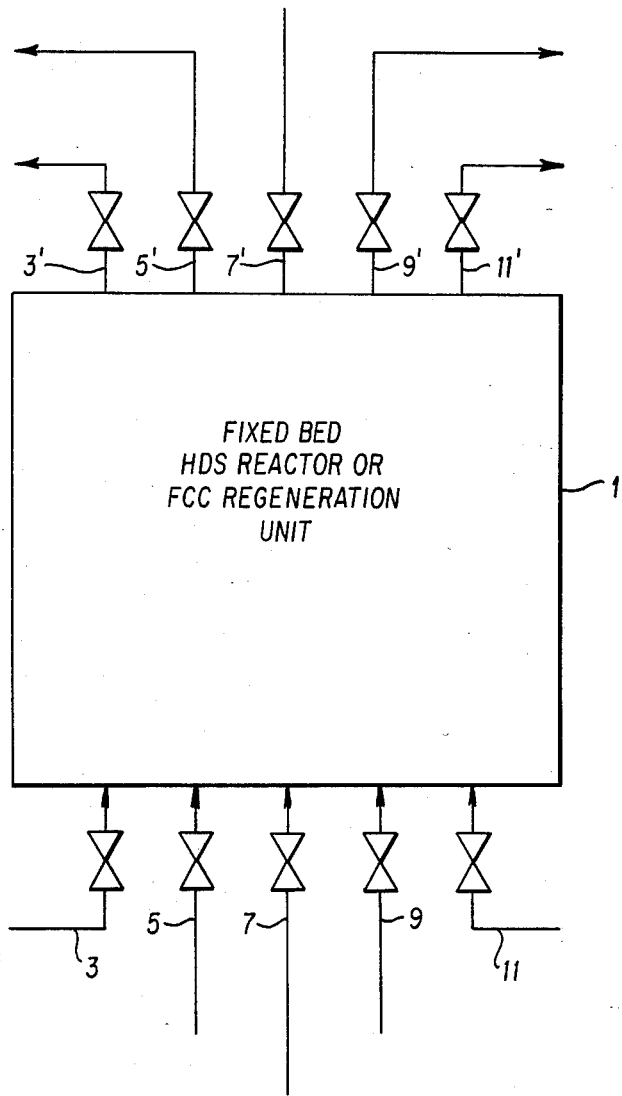
FIG. 1 shows an embodiment of the present process, in which a spent fixed bed catalyst is treated in a HDS unit in order to regenerate the catalyst in place.

FIG. 1 shows an embodiment of the present process in which a spent fixed bed catalyst is treated in an HDS unit 1 in order to regenerate the catalyst in place of the reactor. Prior to regeneration of the catalyst, the same is subjected to conventional procedures for removing residual oil and carbon deposits therefrom. Procedures which can be utilized to accomplish these objectives include draining oil from the catalyst bed, washing oil from the catalyst pores by the circulation of an appropriate oil dissolving solvent through the catalyst bed such as acetone, and removing carbon deposits from the catalyst pores by oxidation with air or an oxygen containing gas. These procedures are all known in the art and need no further explanation. Subsequent to the above treatments, the catalyst is treated with gaseous hydrogen sulfide in order to sulfide the catalyst. Hydrogen sulfide, normally diluted in a carrier gas such as nitrogen, helium, hydrogen, argon or the like, is passed through the catalyst bed of reactor 1 through lines 5 and 5'. The amount and rate of hydrogen sulfide passed through the catalyst is any quantity which effectively sulfides the catalyst. Normally, a carrier gas diluted with from 1 to 10% $H_2S$ and passed through the catalyst bed at a rate of $6.24 \times 10^{-3}$ to $6.24 \times 10^{-2}$ $m^3$/min/kg catalyst for a time period of about 0.5 to 5 hours at a bed temperature ranging from 260° to 593° C. is sufficient to sulfide the catalyst. Following sulfidation, the catalyst is leached with an aqueous ferric ion containing solution to extract and remove metal impurities from the catalyst. Suitable sources of ferric ions include such simple salts as $FeCl_3$, $Fe(NO_3)$, $Fe_2(SO_4)_3$ and the like. As shown in FIG. 1 aqueous leaching solution containing ferric ion in a concentration sufficient to oxidize impurity metals in the catalyst is passed through the catalyst bed through lines 9 and 9'. The aqueous leaching solution usually contains ferric ion in a concentration ranging from 0.1 to 2.0 molar, is normally acidic at a pH of below about 3.5, and leaching is effected at a temperature ranging from 25° to 100° C. The leaching solution discharged from the reactor is either sent to waste or recycled to subsequent leaching treatments as long as it can be effectively used. If not discarded, the spent leaching solution can be regenerated to recover metals as a side product. In order to complete the catalyst regeneration process, the leached catalyst is washed with water in lines 11-11' and dried with a flow of inert gas such as air through line 7-7'.

Figure 2:
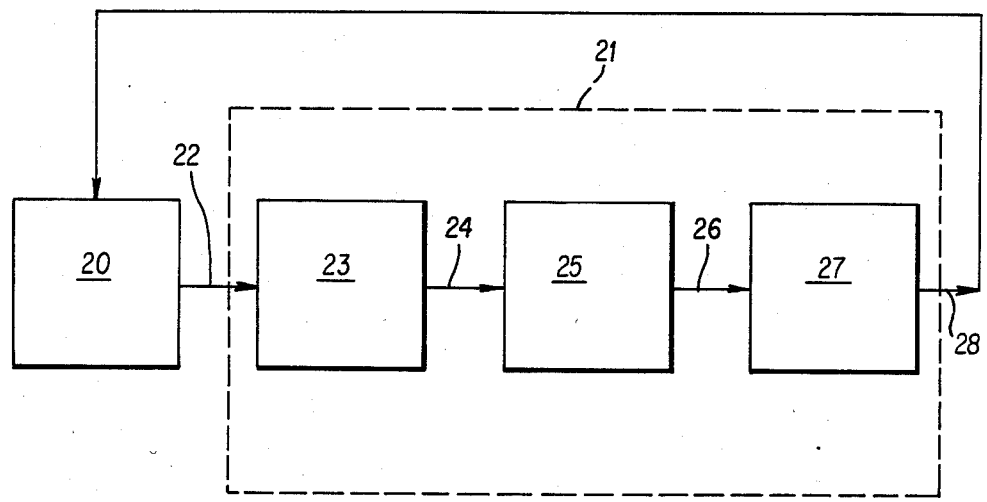
FIG. 2 shows an embodiment of the present process, in which spent catalyst is removed from a reactor and sent to a multi-step metals removal system.

In a second embodiment of the invention, the catalyst to be regenerated is continuously or batchwise removed from the reactor which is an HDS reactor, fluid catalyst cracking (FCC) regenerator or the like. Removal of the catalyst from the reactor follows pretreatment of the catalyst to remove oil and carbon deposits therefrom if desired. Referring to FIG. 2, spent catalyst is removed from reactor 20 and sent to the pretreatment stage 23 of the multi-step metals removal system 21 through line 22. In the pretreatment step the spent catalyst is sulfided with H₂S gas under the conditions described above. The sulfided catalyst is then discharged into leaching unit 25 through line 24 where it is subjected to the aqueous ferric ion containing leaching solution under much the same conditions as described above. An advantage that this embodiment has over the above first embodiment is that the leaching step can be conducted over a shorter time period, quite commonly over 1–40 minutes. During the leaching step in the batch mode of operation, the treatment is effected with a catalyst slurry with stirring in an appropriate vessel. As above, the spent leaching solution is either wasted or treated to recover metals therefrom. To complete catalyst regeneration, the leached catalyst is discharged to washing unit 27 via line 26. Washing and drying of the catalyst is accomplished as described above. The processed catalyst is passed back to the reactor via line 28.

The third embodiment of the present process involves the identical steps of both of the abovedescribed catalyst processing techniques, with an additional pretreatment step occurring prior to pretreatment of the spent catalyst with H₂S in which the catalyst is treated with an aqueous ferric ion containing leaching solution. The contact of the catalyst with the leaching solution occurs under the same time, temperature and ferric ion concentration parameters described above for the second embodiment of the process. Following the oxidative pretreatment, the entire sequence of steps of either of the above two described processes is conducted depending upon which process technique is chosen to process a given batch of catalyst. Optionally, the pre-leached catalyst can also be water washed and air dried before the sulfidation step in each process modification.

The fourth embodiment of the present treatment process is a significant modification of the steps of the first two described processes. The modification involves subjecting the catalyst treated with hydrogen sulfide to a liquid hydrocarbon such as an oil which fills the pores of the catalyst. (In FIG. 1, oil is shown as passing through the reactor via lines 3–3'.) Usually, a time of 0.5 to 3 hours is sufficient to penetrate the pores with solvent. The total amount of hydrocarbon solvent employed should preferably be less than or equal to the total pore volume of the catalyst particles, although amounts of solvent in excess of the total pore volume can be used. Usually, the hydrocarbon treatment is conducted at ambient temperatures. Following the hydrocarbon treatment step, the catalyst can optionally be washed with water at ambient temperatures or elevated temperatures and then optionally dried with air prior to leaching of the catalyst with the aqueous ferric ion containing solution in the usual manner. Processing of the catalyst is then completed by washing the leached catalyst with water and air drying of the catalyst.

In the fifth embodiment of the present process, catalyst is continuously or semicontinuously removed from a fluid catalytic cracking (FCC) regenerator which is employed for the decoking of the catalyst. The catalyst which is obtained is placed in a fixed bed regeneration unit as shown in FIG. 1. In the regeneration unit the catalyst is treated with hydrogen sulfide containing gas under the time and rate conditions stated above. Normally, however, the temperature of the gas treatment in this step ranges from about 315° to 760° C. Following the gas treatment, the catalyst is contacted with the aqueous leaching solution under the stated ferric ion concentration and temperature conditions. The time for contact in this step usually ranges from about 1–60 minutes. The used leaching solution, as stated above, is either discarded or recycled for reuse. Commonly, the leaching solution in all embodiments of the present invention can be recycled up to about 10 times before it must be discarded or processed for metals recovery. Processing of the regenerated catalyst is completed by the previously described water washing and drying steps.

In a sixth embodiment of the present process, catalyst is removed continuously or semicontinuously from a fluid catalytic cracking regenerator and is processed in the metals removal system 21 shown in FIG. 2. The catalyst is processed practically identically as described in the second process embodiment above except that the temperature at which the catalyst is subjected to the hydrogen sulfide containing gas ranges from 315° to 760° C. and that the time period for contact of the catalyst with the leaching solution ranges from 1–60 minutes. Following processing, the regenerated catalyst is returned to the FCC reactor.

In the seventh embodiment of the present invention, the processing steps involved are identical to either the fifth or sixth process embodiment described above. The only difference is that the catalyst is initially treated with an aqueous ferric ion containing leaching solution under the ferric ion concentration and temperature conditions normally employed. The time period employed for the initial pretreatment ranges from 1–60 minutes. The catalyst is then ready for treatment by hydrogen sulfide containing gas, although the catalyst can be subjected to the optional water washing and air drying steps before the gas treatment.

In the second major aspect of the present invention a spent catalyst is simply treated with an oxidizing species of bacteria until the metal contaminants are essentially removed from the catalyst. Suitable bacteria include those of the species selected from the group of *Thiobacillus thiooxidans, Ferrobacillus ferrooxidans, Thiobacillus ferrooxidans, Sulfolobous acidolphus,* and mixtures thereof. A particularly preferred species of oxidizing bacteria is *Thiobacillus ferrooxidans*. The treatment of the spent catalyst is an aerobic process which is conducted in an aqueous solution until the bacteria have sufficient time to effect the removal of the contaminating metal ions from the catalyst. It is believed that the bacteria achieve this removal by the oxidation of the sulfides to sulfates. The sulfate salts are soluble and dissolve in solution, thereby effecting removal of the metal ions. Other bacteria can be added to the treatment solution which do not directly aid in the removal of metal impurities. These bacteria promote the growth of the metal removing bacteria by supplying crucial nutrients such as fixed nitrogen. Such amixed bacterial system is called mutualistic.

The treatment of the spent catalyst with an oxidizing microoganism is generally conducted in an aqueous medium at a temperature sufficient to maintain microorganism activity. The amount of spent catalyst dispersed in the treatment solution can vary widely and is not a critical factor. In fact, the catalyst not only can be treated by agitation in an aqueous solution, but can also be treated by trickling the microorganism and/or ferric ion containing solution down through a fixed or packed bed of the catalyst in a reactor. Usually, a temperature within the range of 0° to 50° C., preferably 20° C. to 37° C., is sufficient for the treatment process. The pH of the solution should also be adjusted to a level which facilitates microorganism activity and generally is within the range of 0.5 to 4.0, preferably 1.0 to 3.5. The pH is maintained within the desired range by addition of a mineral acid such as sulfuric acid or a base such as an alkali metal hydroxide such as potassium hydroxide. To the solution is also added a mixture of basal salts as a nutrient. Suitable examples of nutrient basal salt formulations are the following:

|  | grams/liter |
|---|---|
| Basal Salts #1 | |
| $(NH_4)_2SO_4$ | 3.0 |
| KCl | 0.10 |
| $K_2HPO_4$ | 0.50 |
| $MgSO_4.7H_2O$ | 0.50 |
| $Ca(NO_3)_2$ | 0.01 |
| Adjusted to pH with $H_2SO_4$ | |
| Basal Salts #2 | |
| $(NH_4)_2(SO_4)$ | 0.8 |
| $KH_2PO_4$ | 0.4 |
| $MgSO_4.7H_2O$ | 0.16 |
| Adjusted to pH with $H_2SO_4$ | |

The presence of the fixed nitrogen source ($(NH_4)_2SO_4$) is important and must be present in an amount sufficient to promote microorganism growth. The organism also requires $CO_2$ as the bacterial carbon source which can be obtained atmospherically or can be added along with air. The addition of $CO_2$ might promote the reaction. In the treatment process the aqueous medium is inoculated with an amount of microorganism sample to initiate the catalyst purification process.

The inoculum should be an actively growing culture of the bacteria in the exponential growth phase with a bacterial population of $10^8$ bacteria/ml. While the amount of inoculum is not particularly critical, normally the amount ranges from 5% to 10% of the total liquid volume of suspended catalyst particles. Considerably less inoculum can be used or the inoculum can contain less than $10^8$ cell/ml. However, this will result in longer periods of time for the treatment process. A minimum amount of inoculum, therefore, would be about one ml of a 1% w/v bacterial culture.

After the microorganism treatment process has been conducted for a time sufficient to remove at least a substantial portion of the inorganic contaminants from the catalyst, the catalyst is separated from the treatment solution by any convenient method such as filtration and then washed with water, preferably deionized water. The catalyst obtained, preferably after drying, is then ready for reuse. This method can also be used for the recovery of valuable metals which have accumulated on a spent catalyst. The valuable metals can then be recovered by standard aqueous solution chemical techniques.

A third aspect of the present invention involves treating spent catalyst with a solution containing both ferric ion and oxidizing bacteria. In this situation the solution pH and temperature conditions must be such that microorganism activity is maintained, and these conditions are discussed above in sufficient detail. In this embodiment, the concentration of ferric ions in the solution is limited because ferric ions precipitate from the basal salt containing solution. It is difficult to maintain $Fe^{+3}$ ion concentration above about 100 ppm. In the treatment of the spent catalyst with both oxidizing agents, the agents do not have to be added simultaneously. They can be added stepwise. If ferric ion is added first, some of the ferric ion will be reduced to ferrous ion upon reaction with the metal contaminant. The ferrous ion will be oxidized to ferric ion by the bacteria added, thus replenishing ferric ions in solution. When the bacteria and ferric ions are used together, the process is an aerobic one.

In all of the embodiments of the present invention the contaminating metal impurities are removed from the spent catalyst in the form of metal sulfates, metal sulfides and organometallic compounds. When the metal impurities are present as organometallic compounds, the impurities must be sulfided before treatment of the catalyst. If a relatively valuable metal such as vanadium is recovered by the present process, the treatment solution can be processed by conventional methods to reclaim the metal values from solution, although the methodology of recovering metals from solution is not an aspect of the present invention.

Having generally described this invention, a further understanding can be obtained by reference to certain specific examples which are provided herein for purposes of illustration only and are not intended to be limiting unless otherwise specified.

EXAMPLE 1

A cobalt-molybdenum catalyst to be regenerated in an amount of 1 gram of catalyst per 50 ml of treatment solution was placed in 49 ml of an aqueous acid solution of basal salts having a composition of 0.8 g/l $(NH_4)_2SO_4$, 0.4 g/l of $KH_2PO_4$ and 0.16 g/l $MgSO_4.7H_2O$ at a pH adjustment by $H_2SO_4$ of 2.5. To the treatment solution was also added 1 ml of a one wt percent to volume solution of *Thiobacillus ferrooxidans*. The solution was mildly agitated in a shaker bath and aerated at a temperature of 28° C. The catalyst before treatment had a nickel content of 0.081 wt % and a vanadium content of 0.012 wt %. After reaction for a period sufficient to remove most of the contaminating metal impurities, the catalyst was separated by filtration and washed several times with distilled water. The catalyst after treatment contained nickel and vanadium in amounts of less than 0.001 wt %.

EXAMPLE 2

The process of Example 1 was conducted in the same manner on 0.5 grams of spent alumina-silica catalyst except that a 10 ml culture of *Thiobacillus ferrooxidans* was used in the presence of 40 ml of the basal salt solution used in Example 1. The reaction was conducted at a temperature of 28° C. at a pH of 2.5 while being agitated in a shaker.

| | Analysis of the Catalyst | |
|---|---|---|
| | Before Treatment | After Treatment |
| Ni | 0.623 wt % | 0.426 wt % |
| V | 0.083 wt % | 0.005 wt % |

EXAMPLE 3

A spent silica-alumina catalyst in an amount of 50 grams was added to 800 ml of the basal salt solution used in Example 1. To the solution was also added 1 ml of 1% w/V. *T. ferroxidans* at a pH of 2.5 and a temperature of 28° C. The contents were agitated in a shaker and the treated catalyst was worked-up in the same manner described in Example 1.

| Analysis of the Catalyst | |
|---|---|
| Before Treatment | After Treatment |
| V 0.84 wt % | 0.39 wt % |

EXAMPLE 4

A spent silica-alumina catalyst in an amount of one gram was added to a 50 ml HCl solution containing 5 grams of FeCl$_3$. The aqueous solution was adjusted to a pH below 3.5, and kept at a temperature of 60° C. The solution was agitated with a magnetic stirring bar. The catalyst treated by this procedure was then isolated and washed in the manner described in Example 1.

| Analysis of the Catalyst | | |
|---|---|---|
| | Before Treatment | After Treatment |
| V | 0.81 wt % | 0.005 wt % |
| Ni | 0.623 wt % | 0.001 wt % |

EXAMPLE 5

A catalyst which had been deactivated by the build-up of carbon and metal impurities in a commercial HDS process had the following assay:

| Co | 1.54% |
|---|---|
| Mo | 4.10% |
| V | 10.30% |
| Ni | 2.61% |
| S | 4.98% |
| C | 11.00% |
| Al$_2$O$_3$ | 43.5% |

The catalyst had a BET surface area of 83 m$^2$/gram. The catalyst in its virgin state (prior to use in a commercial HDS process) had a pore volume of 0.5 cm$^3$/gram as determined by mercury porosimetry; an average pore diameter of 70 Å, and a BET surface area of 290 m$^2$/gram. The sample was treated with a solvent (acetone) to remove some of the residual oil within the catalyst pores and on the catalyst external surface. The sample was sieved and all particles within the size range of −9 to +16 mesh were employed in the process. The remaining portion which was outside of this size range was discarded.

The catalyst was dried in air at 110° C. overnight in an atmospheric oven. A portion of this catalyst was given no further treatment prior to leaching. This catalyst sample will be referred to as non-pretreated catalyst. Another portion of the dried catalyst was subjected to calcination in a tubular reactor in order to remove coke from the catalyst pores. For this operation, the catalyst was packed inside a ½ inch diameter stainless steel tube which was then placed inside a furnace. The tube was heated and held at 400° C. while a 10% oxygen in a nitrogen carrier stream was passed through the bed for 2 hours at a gas flow rate of 100 cm$^3$/min g catalyst. Pure inert gas (nitrogen) was passed through the bed after the oxygen stream was shut off and the bed was allowed to cool to ambient temperature. A portion of this catalyst was given no further treatment prior to leaching and will be referred to as calcined-only catalyst. The remaining portion was given a sulfur pretreatment in a tubular reactor in order to convert metal impurities into sulfides. For this operation, the catalyst was packed inside the above-mentioned tubular reactor. The tube was heated, held at 400° C. for 2 hours and then cooled to ambient temperature while a 5% H$_2$S in a helium carrier stream was passed through the bed at a gas flow rate of 1 cc/min g catalyst. The catalyst treated in this fashion will be referred to as calcined/sulfided catalyst.

The leaching of metal impurities from catalysts involved vigorously stirring a mixture of a 1 gram catalyst sample and 50 ml of a solution of FeCl$_3$ in concentrated hydrochloric acid in a flask at 100° C. for a specified period of time, followed by filtering the catalyst from solution and washing with several volumes of distilled water.

Table I shows the amount of metal impurities removed from samples of calcined/sulfided catalyst as a function of contact time for a FeCl$_3$/catalyst weight ratio of 1.25.

Table II shows the amount of metal impurities removed as a function of catalyst treatment and contact time for a FeCl$_3$/catalyst weight ratio of 2.5. BET surface areas of the 20 and 30 minute leached samples of calcined/sulfided catalyst in Table II were respectively 187 and 209 m$^2$/gram.

Table III shows the effect of acid concentration (pH) on the amount of metal impurities removed from samples of calcined/sulfided catalyst at a FeCl$_3$/catalyst weight ratio of 2.5.

Table IV shows the effect of FeCl$_3$ concentration on amount of metal impurities removed from samples of calcined/sulfided catalyst.

TABLE I

Metals Removal vs. Leaching Time
(T = 100° C., pH = 2.5, gms FeCl$_3$/gm Cat = 1.25, Calcined/Sulfided Catalyst)

| Time, (min) | Metals Removal (gms/1000 gm Cat) | |
|---|---|---|
| | Ni | V |
| 1 | 5.7 | 27.0 |
| 3 | 10.0 | 46.5 |
| 5 | 9.4 | 52.5 |
| 20 | 11.1 | 52.5 |

TABLE II

Metals Removal vs. Leaching Time (T = 100° C., pH = 2.5, gms FeCl$_3$/gm Cat = 2.5)

| Time, (min) | Metals Removal (gms/1000 gm Cat) | |
|---|---|---|
| | Ni | V |
| (Non-pretreated Catalyst) | | |
| 15 | 6.1 | 9 |
| 30 | 8.0 | 15 |
| (Calcined Catalyst) | | |
| 15 | 17.3 | 16.9 |
| 30 | 19.2 | 20.0 |
| (Calcined/Sulfided Catalyst) | | |
| 20 | 21.0 | 85.0 |
| 25 | 16.4 | 78.0 |
| 30 | 18.8 | 81.5 |
| 40 | 21.2 | 86.5 |

TABLE III

Effect of pH on Metals Removal
(T = 100° C., gms FeCl₃/gm Cat = 2.5,
t = 40 min., Calcined/Sulfided Catalyst)

| pH | Metals Removal (gms/1000 gm Cat) | |
| --- | --- | --- |
|  | Ni | V |
| 2.5 | 21.2 | 86.5 |
| 3.5 | 21.7 | 93.5 |
| 4.5 | 21.4 | 82.1 |
| 5.5 | 20.1 | 77.5 |
| 6.5 | 20.6 | 82.5 |

TABLE IV

Effect of FeCl₃ Concentration on
Metals Removal (T = 100° C., pH = 6.0,
t = 40 min., Calcined/Sulfided Catalyst)

| FeCl₃ Conc. (gm/gm Cat) | Metals Removal (gms/1000 gm Cat) | |
| --- | --- | --- |
|  | Ni | V |
| 0 | 4.0 | — |
| 0.25 | 5.6 | 16.7 |
| 0.5 | 6.5 | 30.5 |
| 1.5 | 8.6 | 55.0 |
| 2.5 | 20.4 | 80.5 |

EXAMPLE 6

A catalyst which has been deactivated by carbon and metal impurities in a commercial FCC process was obtained and had the following impurities content:

| Ni | 3800 ppm |
| --- | --- |
| V | 5800 ppm |

One portion of this catalyst was given no treatment prior to leaching. This catalyst sample will be referred to as non-pretreated catalyst. Another portion was subjected to a sulfiding operation as described in Example 1 except that the sulfiding temperature and time conditions were different from those in Example 1. This catalyst sample will be referred to as sulfided catalyst.

The procedure for leaching of metal impurities from catalysts was identical to that described in Example 1, except that Fe(NO₃)₃·9H₂O was used instead of FeCl₃.

Table 5 shows the amount of metal impurities removed from the catalyst as a function of catalyst treatment and sulfiding time and leaching time.

TABLE 5

Effect of Pretreatment
on Metals Removal from FCC Catalyst
(T = 100° C.)

| | Metals Removal (%) | |
| --- | --- | --- |
| | Ni | V |
| (Untreated) Leaching Time (min.) | | |
| 1 | 11 | 35 |
| 5 | 15 | 46 |
| 15 | 21 | 62 |
| 30 | 25 | 72 |
| (Sulfided @ 425° C., 120 min.) Leaching Time (min.) | | |
| 1 | 20.8 | 38.1 |
| 15 | 36.7 | 71.2 |
| (Sulfided @ 540° C., 30 min.) Leaching Time (min.) | | |
| 1 | 25.5 | 38.1 |
| 15 | 33.5 | 65.4 |
| (Sulfided @ 540° C., 120 min.) Leaching Time (min.) | | |
| 1 | 29.9 | 36.2 |
| 15 | 35.8 | 64.2 |

EXAMPLE 7

Another catalyst which had been deactivated by carbon and metal impurities in a commercial FCC process was obtained and had the following impurities content:

| Ni | 2400 ppm |
| --- | --- |
| V | 2500 ppm |

The procedure for the treatment of this catalyst was as described in Example 2. Table 6 shows the amount of metal impurities removed from the catalyst as a function of sulfiding conditions and leaching time.

TABLE 6

Effect of Pretreatment on Metals
Removal from FCC Catalyst (T = 100° C.)

| | Metals Removal (%) | |
| --- | --- | --- |
| | Ni | V |
| (Untreated) Leaching Time (min.) | | |
| 1 | 0.8 | 23.5 |
| 5 | 1.4 | 29.5 |
| 15 | 2.2 | 31.2 |
| 30 | 3.5 | 34.0 |
| (Sulfided @ 425° C., 120 min.) Leaching Time (min.) | | |
| 1 | 1.8 | 25.6 |
| 15 | 2.8 | 36.2 |
| (Sulfided @ 540° C., 30 min.) Leaching Time (min.) | | |
| 1 | 3.8 | 23.8 |
| 15 | 5.6 | 32.3 |
| (Sulfided @ 540° C., 120 min.) Leaching Time (min.) | | |
| 1 | 6.6 | 24.8 |
| 15 | 9.7 | 34.5 |
| (Sulfided @ 540° C., 21 hours) Leaching Time (min.) | | |
| 1 | 9.7 | 28.1 |
| 15 | 16.6 | 36.1 |
| (Sulfided @ 650° C., 120 min.) Leaching Time (min.) | | |

TABLE 6-continued

Effect of Pretreatment on Metals
Removal from FCC Catalyst (T = 100° C.)

| | Metals Removal (%) | |
|---|---|---|
| | Ni | V |
| 1 | 23.2 | 25.4 |
| 15 | 26.4 | 32.5 |
| (Sulfided @ 760° C., 120 min.) Leaching Time (min.) | | |
| 1 | 76.1 | 13.8 |
| 15 | 83.2 | 21.6 |

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A method for regenerating spent catalysts selected from the group consisting of porous cobalt-molybdenum catalysts which are used in the hydrotreating of petroleum residues and silica-alumina zeolite cracking catalysts which are used in the cracking of hydrocarbon feedstocks for the removal of nickel and vanadium impurities, comprising:
   (a) treating said spent catalyst with a 1-10% mixture of hydrogen sulfide in an inert gas at elevated temperature for a time sufficient to sulfide the spent catalyst; and
   (b) treating the sulfided catalyst with an aqueous ferric ion containing solution without added oxidizing bacteria, thereby leaching impurity metal ions from said catalyst.

2. The method of claim 1, wherein, prior to said processing, said spent catalyst is prepared for regeneration by draining residual oil from said spent catalyst, washing oil from the catalyst pores by circulation of solvent through the spent catalyst, and removing carbon deposits from said washed catalyst.

3. The method of 2, wherein said spent catalyst is a fixed bed in an HDS unit, and after the leaching step with aqueous ferric ion containing solution, said regenerated catalyst is washed with water and dried.

4. The method of claim 2, wherein said spent catalyst is continuously or batchwise removed from the fixed bed of an HDS unit, and the regenerated catalyst after said leaching treatment is washed with water and dried.

5. The method of claim 1, wherein said spent catalyst is that which is continuously or semi-continuously removed from a fluid catalytic cracking regenerator and is regenerated in a fixed bed regeneration unit.

6. The method of claim 1, wherein said catalyst is continuously or semicontinuously removed from a fluid catalytic cracking regenerator and wherein the process of metal removed is conducted either semicontinuously or batchwise, said regenerated catalyst being water washed and dried prior to reuse.

7. The method of claim 1, wherein said $H_2S$ containing gas is passed through said catalyst at a rate of $6.24 \times 10^{-3}$ to $6.24 \times 10^{-2}$ m$^3$/min/kg for 0.5 to 5 hr at a temperature of 260° to 593° C.

8. The method of claim 1, wherein said $H_2S$ containing gas is passed through said catalyst at a rate of $6.24 \times 10^{-3}$ to $6.24 \times 10^{-2}$ m$^3$/min/kg for 0.5 to 5 hr at a temperature of 315° to 760° C.

9. The method of claim 1, wherein the sulfided catalyst is leached with from 0.1 to 2.0 molar ferric ion containing solution for 1–40 minutes at a temperature of 25° to 100° C.

10. The method of claim 4, wherein in said batchwise treatment, said catalyst is treated as a 20% slurry in a stirred vessel.

11. The method of claim 1, wherein said source of ferric ion is a simple ferric salt.

12. The method of claim 1 including the steps of calcining the catalyst in the presence of oxygen to remove coke prior to step (a), and, subsequent to step (b), of washing and drying the catalyst to recover regenerated catalyst.

13. The method of claim 12 wherein calcining is carried out at a temperature of about 400° C., the temperature and time of step (a) are about 400° C. and about two hours respectively, and the temperature and time of step (b) are about 100° C. and at least about fifteen minutes respectively.

14. The method of claim 13 wherein the time of step (b) is sufficient to recover catalyst having a BET surface area of at least 187 m$^2$/gm.

* * * * *